Patented May 8, 1934

UNITED STATES PATENT OFFICE 1,957,789

CHOCOLATE BUTTER AND METHOD OF MAKING SAME

Jerome J. Lyons and Daniel A. Farrell, Chicago, Ill., assignors to John F. Jelke Company, Chicago, Ill., a corporation of Illinois No Drawing. Application May 16, 1932, Serial No. 611,714

10 Claims. (Cl. 99—11)

Our invention relates to a chocolate butter preparation and a process for its manufacture. More particularly, our invention relates to a chocolate flavored butter product in which the ordinary properties of butter which make it so desirable as a spread for bread, etc. such as its texture and spreadability are not impaired.

Such a preparation cannot be produced by merely mixing chocolate or cocoa into butter. However, we have found that the texture, flavor and spreadability may be preserved and a satisfactory product obtained by a special treatment of the butter before and after the incorporation of the cocoa or chocolate preparation therewith, and by the use of a chocolate syrup which, together with a suitable emulsifying agent, is incorporated into the butter.

It is, therefore, an object of this invention to produce a chocolate flavored butter composition in which the desirable physical characteristics of the butter are not impaired.

It is a further object of this invention to provide a butter composition which contains a chocolate flavoring material emulsified therewith.

It is an additional object of this invention to provide a process by which butter may be flavored with chocolate without impairing its desirable physical characteristics.

Other and further objects of this invention will be apparent from the following specification and the accompanying claims.

We prefer ordinary creamery butter for use in our process. Since this product usually has a moisture content of from 15 to 16%, we first subject it to a series of steps to improve its texture and to remove a part of its water content. This is preferably accomplished by working the butter in an ordinary butter worker or blender. In addition to this, we have found it advantageous to put the butter through a screw feed print machine. This step produces a further working of the butter, improving its texture and expressing more of the moisture. We have found that these steps will result in a reduction of the moisture content by about 1½% to 2%. The printing operation also puts the butter in a convenient form for handling.

After printing, by which we mean forming the butter into bars, the product is placed in a cooler where it is kept at a temperature of 0° for a period of time. The exact time is not critical, but a period or from 5 to 6 hours will be satisfactory. For this purpose, any suitable cooling device may be used, but we prefer what is commonly known as a Sharp cooler. The effect of this process is to cause the butter to sweat, or in other words, a portion of its water content comes to the surface, and this surface water is suitably removed, thereby further reducing the percentage of moisture. The butter is now ready for use in the manufacture of our preparation.

We prefer that the chocolate used in our preparation be in the form of a syrup. A syrup of the following formula is satisfactory, but we do not desire to have this construed as a limitation on our invention, for, obviously, many other types of chocolate syrups could be compounded which would be operative in this invention:

| | Percent |
|---|---|
| Sugar | 62.2 |
| Water | 18.5 |
| Cocoa | 12 |
| Chocolate | 7 |
| Salt | .2 |
| Vanilla (or other flavor) | .01 |

In addition to these ingredients, we find that an emulsifying agent is essential. For this purpose, we prefer an emulsifying agent, commonly sold under the name of "Emargol". This is a complex fatty mixture consisting of approximately 50 to 55% of moisture and 45 to 50% of fatty matter. The active emulsifying agent in the fatty matter is monostearyl glycerine sodium sulphoacetate of which the emulsifying agent contains approximately 15 to 20%.

The structural formula of the monostearyl glycerine sodium sulphoacetate appears to be:

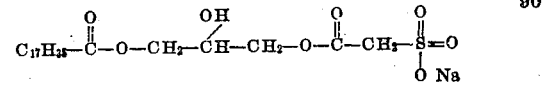

Some of the equivalents of the monostearyl glycerine sodium sulphoacetate are monomelissyl glycerine sodium sulphoacetate, monopalmityl sodium sulphoacetate and mono-oleyl sodium sulphoacetate. The stearic acid may be replaced by any fatty acid residue containing between 8 and 30 carbon atoms, and the substance will still function like monostearyl glycerine sodium sulphoacetate. However, as the molecular weight of the fatty acid diminishes, the emulsifying power also diminishes somewhat.

Of course, it will be understood that other edible emulsifying agents such as agar-agar, gum tragacanth, etc., may be used if desired, but not so satisfactorily.

In preparing our product the above ingredients are next mixed in the following proportions:

|                                              | Parts |
|----------------------------------------------|-------|
| Butter (worked as above stated)              | 100   |
| Chocolate syrup                              | 50    |
| Emargol or other emulsifying agent           | 1½    |

These substances are preferably next mixed together in a blender. One half of the chocolate syrup should be added first, followed by the butter and then the other half of the chocolate syrup. The emulsifying agent may be added along with either of the other ingredients. We prefer to add part of the chocolate syrup first because this prevents the butter from adhering to the blender, causing light spots of unmixed butter in the finished product.

After these ingredients have been thoroughly mixed and blended together in the blender, the resulting mixture is put into the Sharp cooler again and held at about 0° for five or six hours, after which it is printed and packed for shipment.

The emulsifying agent has the effect of making the mixture or emulsion permanent and preventing the chocolate syrup from sweating out during the second cooling state as the water does during the first one.

The working of the butter gives the finished product a smooth, butter-like texture which cannot otherwise be obtained. If the working steps are omitted, the resulting product will be granular in nature and the moisture and chocolate will have a tendency to sweat out. However, there is no tendency for our product to sweat or separate on standing if made in accord with the procedure outlined above. Of course, it will be understood that various mechanical means may be used to accomplish the working of the butter, and the means given above is merely to illustrate one practical method, and is not to be construed as a limitation.

Our product has a butter fat content of from 55 to 60% and a sugar content of about 20%. When prepared in accord with the above procedure, our product is an emulsion in which the butter is the continuous phase and the chocolate syrup, which contains substantially all of the sugar, is the discontinuous phase. We attribute the marked resemblance of our material to butter in its texture and spreadability to this fact.

Of course, it will be understood that while we have specified the use of both sugar and chocolate in our preparation, the relative proportion of these substances is not critical and we may even use one to completely replace the other, if desired.

We are aware that numerous details of our process and the product thereof may be varied to a wide range without departing from the principles of our invention, and we, therefore, do not purpose limiting the patent granted hereon other than necessitated by the prior art.

We claim as our invention:

1. A food preparation of semi-solid consistency and spreadable at room temperatures comprising a substantially permanent homogeneous emulsion of an aqueous chocolate-bearing material in butter, and an emulsifying agent, the butter being present in the emulsion in a major proportion by weight.

2. A food preparation of semi-solid consistency and spreadable at room temperatures, comprising a substantially permanent homogeneous emulsion of an aqueous suspension of chocolate material in butter and monostearyl glycerine sodium sulphoacetate as the active emulsifying agent.

3. A food preparation of semi-solid consistency and spreadable at room temperatures, comprising a substantially permanent homogeneous emulsion of an aqueous portion containing a chocolate-bearing material and sugar, butter, and an emulsifying agent, the aqueous portion and the butter being initially mixed in the proportion of about 1 part of the aqueous portion to 2 parts of the butter by weight.

4. A food preparation of semi-solid consistency and spreadable at room temperatures, comprising a substantially permanent homogeneous emulsion of an aqueous portion containing a chocolate-bearing material and sugar, butter, and an emulsifying agent.

5. A food preparation of semi-solid consistency and spreadable at room temperatures, comprising a substantially permanent homogeneous emulsion of an aqueous portion containing a chocolate-bearing material and sugar, butter, and an emulsifying agent, the butter constituting a major proportion of said emulsion.

6. A food preparation of semi-solid consistency and spreadable at room temperatures, comprising a substantially permanent homogeneous emulsion of an aqueous portion containing a chocolate-bearing material and sugar, butter, and monostearyl glycerine sodium sulphoacetate, the butter constituting a major proportion of said emulsion by weight.

7. A food preparation of semi-solid consistency and spreadable at room temperatures, comprising a substantially permanent homogeneous emulsion of an aqueous chocolate-bearing material in butter, and an emulsifying agent, said butter being present in a major proportion by weight and being the continuous phase of said emulsion.

8. The process of preparing a chocolate-flavored food composition, which comprises emulsifying with butter by means of an emulsifying agent, an aqueous syrup of a chocolate-bearing material, to produce a substantially permanent homogeneous emulsion of semi-solid consistency and spreadable at room temperatures.

9. The process of preparing a chocolate-flavored food composition, which comprises emulsifying with butter an aqueous chocolate-bearing liquid by means of an emulsifying agent having as its active constituent a glyceryl ester of a higher fatty acid and of sodium sulphoacetate, to produce a substantially permanent homogeneous emulsion of semi-solid consistency and spreadable at room temperatures.

10. The process of preparing a chocolate-flavored food composition, which comprises emulsifying an aqueous syrup containing a chocolate-bearing material and sugar with a butter by means of monostearyl glycerine sodium sulphoacetate to produce a substantially permanent homogeneous emulsion of semi-solid consistency and spreadable at room temperatures.

JEROME J. LYONS.
DANIEL A. FARRELL.